(12) United States Patent
Spalding

(10) Patent No.: US 9,520,208 B2
(45) Date of Patent: Dec. 13, 2016

(54) HYBRID CONDUCTOR

(71) Applicant: ABB Technology AG, Zurich (CH)

(72) Inventor: Matthew Spalding, Cornelius, NC (US)

(73) Assignee: ABB SCHWEIZ, Baden (CH)

(*) Notice: Subject to any disclaimer, the term of this patent is extended or adjusted under 35 U.S.C. 154(b) by 61 days.

(21) Appl. No.: 14/466,498

(22) Filed: Aug. 22, 2014

(65) Prior Publication Data
US 2016/0055942 A1 Feb. 25, 2016

(51) Int. Cl.
H01B 7/30 (2006.01)
H01B 7/28 (2006.01)
H01B 3/30 (2006.01)
H01B 1/02 (2006.01)
H01B 1/04 (2006.01)
H01B 9/00 (2006.01)

(52) U.S. Cl.
CPC ............... *H01B 7/28* (2013.01); *H01B 1/023* (2013.01); *H01B 1/026* (2013.01); *H01B 1/04* (2013.01); *H01B 3/307* (2013.01); *H01B 9/006* (2013.01)

(58) Field of Classification Search
CPC .................................. H01B 7/30; H01B 1/026
USPC ........................................ 174/102 R, 113 R
See application file for complete search history.

(56) References Cited

U.S. PATENT DOCUMENTS

| 4,549,042 A | 10/1985 | Akiba et al. |
| 4,783,576 A * | 11/1988 | Silver .................. H01B 9/0605 156/53 |
| 5,223,349 A | 6/1993 | Kudo et al. |
| 6,376,775 B1 * | 4/2002 | Leijon ....................... H01F 3/10 174/128.1 |
| 7,572,980 B2 | 8/2009 | Elie et al. |
| 8,245,396 B2 | 8/2012 | Kondo et al. |
| 2012/0163758 A1 | 6/2012 | McCullough et al. |
| 2012/0234577 A1 | 9/2012 | Kim et al. |

FOREIGN PATENT DOCUMENTS

| EP | 2224457 A1 | 1/2010 |
| WO | WO2014127661 A1 | 8/2014 |

* cited by examiner

Primary Examiner — Timothy Thompson
Assistant Examiner — Amol Patel
(74) Attorney, Agent, or Firm — Taft Stettinius & Hollister LLP

(57) ABSTRACT

A cable comprising that includes an elongated conductor operable to transmit electrical energy at medium or high AC voltages. The conductor has a core including a first plurality of wires of a first conductive material, and an outer layer surrounding the core including a second plurality of wires of a second conductive material. The first conductive material has a deeper characteristic skin depth than the second conductive material. The total cross sectional area of the first and second plurality of wires is at least about 2500 kcmil.

19 Claims, 4 Drawing Sheets

HYBRID CONDUCTOR

FIELD OF INVENTION

The present disclosure concerns cables for conducting electrical current with hybrid conductors, in particular high voltage conductors including electrically conductive wires.

BACKGROUND

Copper conductors have higher ampere capacity ("ampacity") than aluminum conductors and can be considered preferable over aluminum for a variety of applications, in particular in applications where voltage and conductor size demands are in ranges where the ampacity difference between copper and aluminum is most pronounced. However, as one or both of current and cross-sectional area of a copper conductor increase, "skin effect" causes a greater proportion of current to travel through the conductor at the periphery of the conductor and a lesser proportion of current to travel through the center of the conductor. For example, for copper conductor having a cross sectional size larger than about 2500 kcmil to 3000 kcmil, the addition of additional copper wire, thereby increasing the thickness, would provide less ampacity per unit volume of the copper conductor than for a smaller wires. Further, due to the skin effect, the marginal contribution of additional to the ampacity of the conductor decreases as it gets larger, resulting in greater inefficiencies in electrical power transmission through such cables. In addition, copper monetary cost is greater than other potential conductors such as aluminum, and the weight of copper per unit volume is also greater than other potential conductors, such as aluminum, which results in greater costs inherent in transporting and installing such conductors. Thus, a conductor that mitigates against such inefficiencies and costs would be beneficial.

SUMMARY

A cable comprising that includes an elongated conductor operable to transmit electrical energy at medium or high AC voltages. The conductor has a core including a first plurality of wires of a first conductive material, and an outer layer surrounding the core including a second plurality of wires of a second conductive material. The first conductive material has a deeper characteristic skin depth than the second conductive material. The total cross sectional area of the first and second plurality of wires is at least about 2500 kcmil.

BRIEF DESCRIPTION OF THE DRAWINGS

In the accompanying drawings, structures and methods are illustrated that, together with the detailed description provided below, describe aspects of an electrically conducting cable having a hybrid conductor. It will be noted that a single component may be implemented as multiple components or that multiple components may be implemented as a single component. The figures are not drawn to scale and the proportions of certain parts have been exaggerated for convenience of illustration. Further, in the accompanying drawings and description that follow, like parts are indicated throughout the drawings and written description with the same reference numerals, respectively.

DETAILED DESCRIPTION

Figure 1:
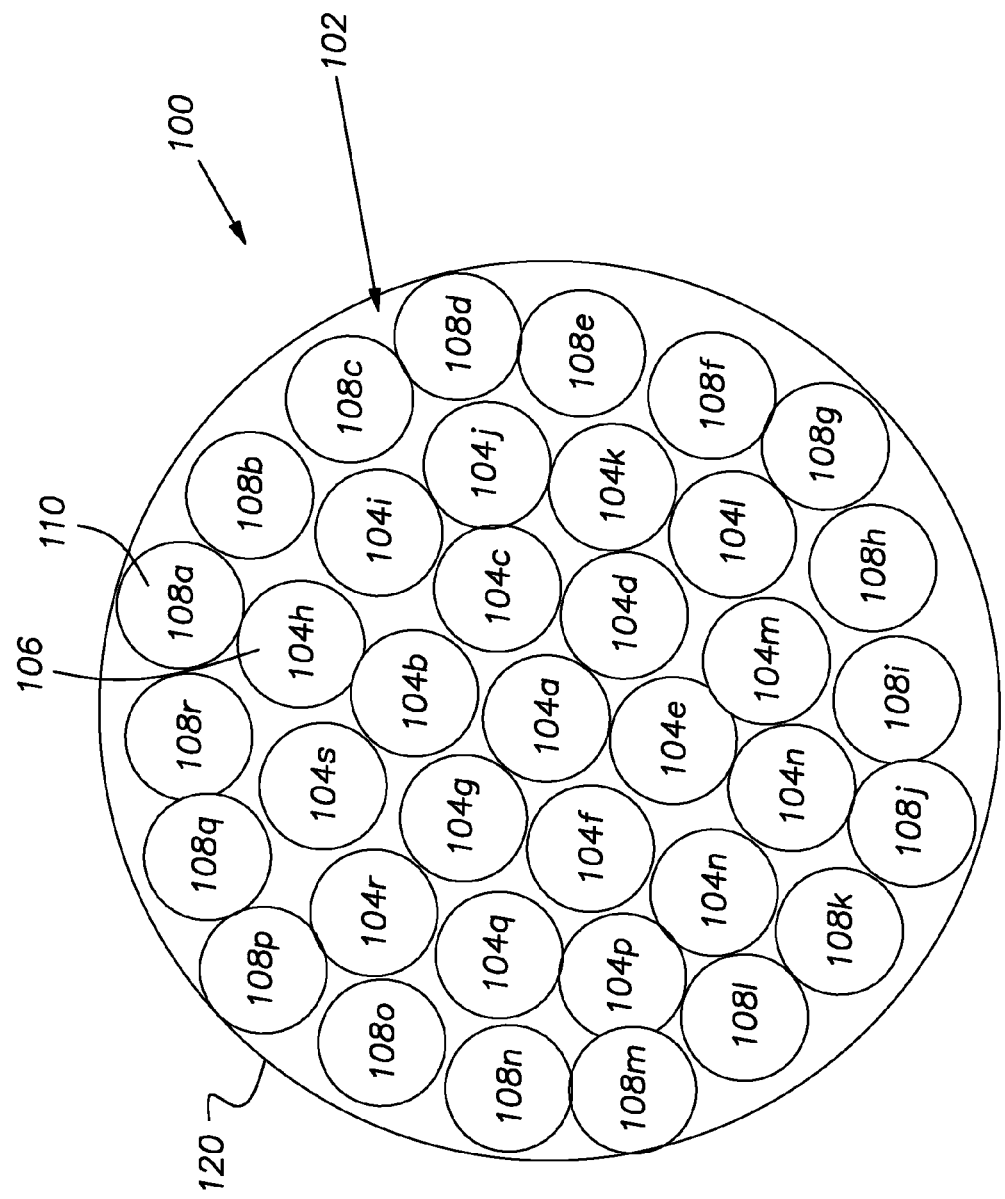
FIG. 1 illustrates a cross-sectional view of conducting cable 100.

With reference to FIG. 1, a conducting cable 100 includes a conducting wire bundle 102 having a plurality of wires 104a-104s of a first conductive material. As used herein, the term "wire" denotes a solid or woven, non-hollowed wire of a particular conductive material, such as copper, aluminum, or other conductive metal or alloy. The plurality of wires 104a-104s together form a core 106 surrounded by a plurality of wires 108a-108r including a second conductive material. The plurality of wires 108a-108r together form an outer layer 110 surrounding the core. According to one aspect of the present teachings, the first conductive material and second conductive material are chemically distinct materials. According to another aspect of the present teachings, the first conductive material is aluminum, and the second conductive material is copper. According to a further aspect of the present teachings, the cable 100 is a medium or high voltage cable, operable to be able to conduct AC current at in the kilovolt range, including for example at voltages of about 20 kV or greater under normal operation. The total cross sectional area of the wires 104a-104s and 108a-108r can be at least 2500 kcmils. According to another aspect of the present teachings, the total cross sectional area of the wires 104a-104s and 108a-108r can be at least 3000 kcmils. According to yet another aspect of the present teachings, the total cross sectional area of the wires 104a-104s and 108a-108r can be at least 3500 kcmils.

According to yet another aspect of the present teachings, a subset of the conductive wires in the conductor include a particular conducting metal having a particular characteristic skin effect depth, which will also be referred to herein as "characteristic skin depth." Characteristic skin depth values of metals can be determined by referring to chemical or electrical reference literature, or by direct measurement of, for example, the depth of the wire through which a certain fraction of the current is concentrated. The remaining conducting wires not in the aforementioned subset, i.e. the complementary set of wires, can include a different conducting metal having a different characteristic skin depth. According to yet another aspect of the present teachings, at least one of the wires used in the subset of wires or the complementary set of wires have an outer barrier including a nonconductive oxide of the material used. For example, aluminum wires can include an outer barrier of aluminum oxide and be combined with copper wires. In another example, aluminum wires can be combined with chemically distinct aluminum alloy wires with both having a nonconductive outer barrier of aluminum oxide.

The conducting cable 100 includes an outer sheath 120 that surrounds bundle 102. According to one aspect of the present teachings, the outer sheath 120 can be made of a nonconductive material, including but not limited to polyethylene, Mylar or other nonconductive materials and combinations thereof. According to another aspect of the present teachings, the outer sheath 120 can include a waterproof material such that the bundle 102 including the first and second conductive materials, respectively, are protected from external sources of moisture. According to yet another aspect of the present teachings, the sheath 120 can be removed, or material in addition to or different from the sheath 120 can surround the wire bundle 102 to perform various functions, such materials including metals and non-metal, or naturally occurring and synthetic materials.

Figure 2:
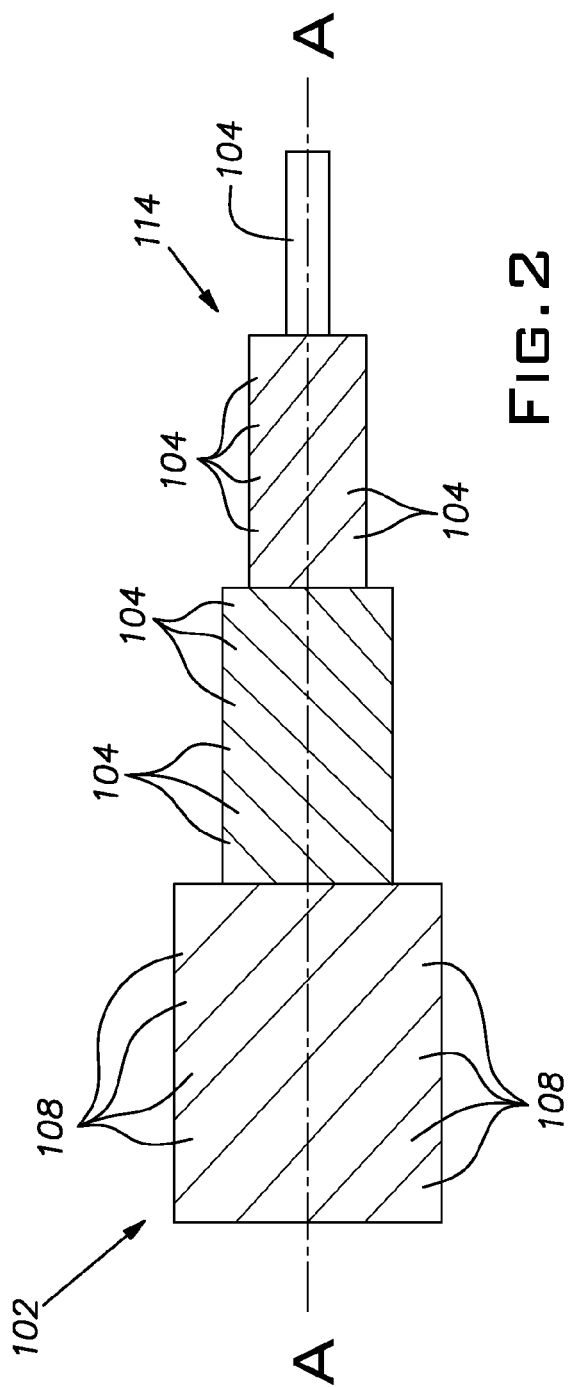
FIG. 2 illustrates a partial side-sectional view of conducting cable 100.

With reference to FIG. 2, the elongated wires 108 and wires 104 are shown twisted about the longitudinal axis A of the wire bundle 102 in opposing clockwise and counter-clockwise directions relative to adjacent layers. According to another aspect of the present teachings, the wires 104, 108 can be wrapped or woven in different configurations.

Figure 3:
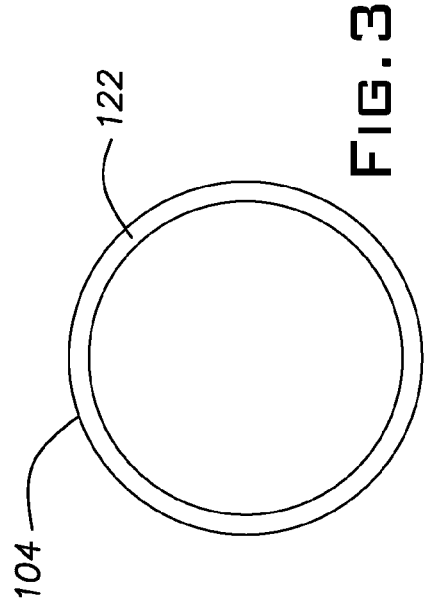
FIG. 3 illustrates a cross-sectional view of wire 108.

With reference to FIG. 3, one of the plurality of wires 104 includes the first conductive material and an insulating barrier 122. According to one aspect of the present teachings, the insulating barrier 122 is aluminum oxide, which is an electrical insulator. Such an insulating barrier 122 can be generated, for example, by exposure of aluminum wire 104 to oxygen, which results in the aluminum on the surface of wire 104 undergoing oxidation to form an aluminum oxide outer insulating barrier 122. As used herein, the term "uncoated" denotes the lack of any insulating material applied or otherwise found on the outer surface of the wires such as wires 104, 108 referred to in FIGS. 1 and 2 herein, with the exception of any one or more of the various possible oxide forms of the underlying material of the wires. As such, aluminum wires that are "uncoated" will not include any enamel coating or otherwise have any coating of insulating material or sheath placed on the outer surface of the wires. However, such an "uncoated" wire can include an outer barrier of aluminum oxide, such as a barrier of aluminum oxide having chemical formula $Al_2O_3$ on the outer surface of the aluminum wire.

Figure 4:
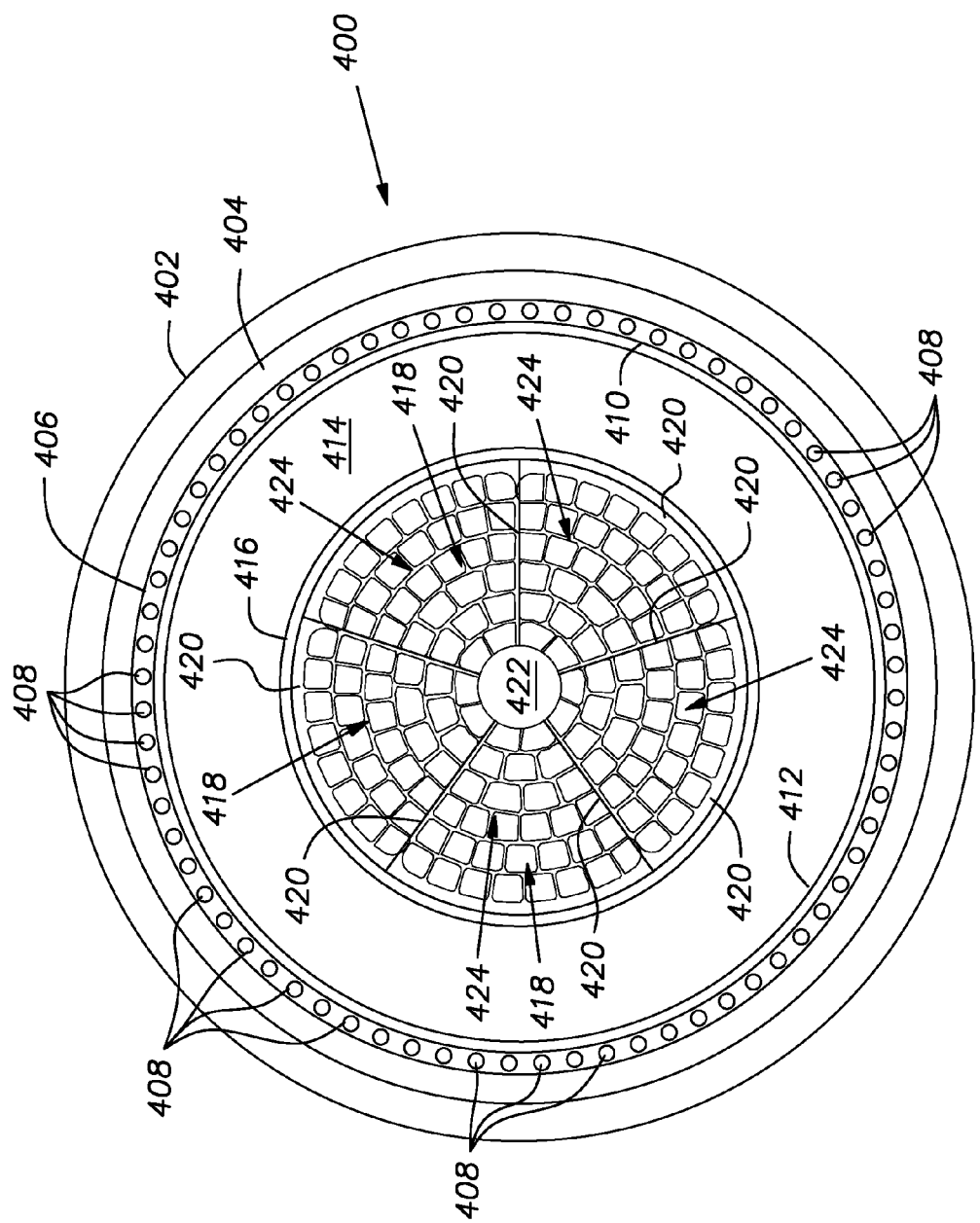
FIG. 4 illustrates a cross-sectional view of Milliken cable 400.

With reference to FIG. 4, a cross-sectional view of a cable 400 configured to conduct electrical current. The cable 400 can have several layers of material surrounding the wires disposed closer to the cross-sectional center of the cable 400. An outermost layer 402 of polypropylene can protect the cable from environmental contaminants that can damage the underlying layers and in particular the conducting central portion. Underneath the polypropylene layer 402, a lead sheath 404 can further protects the layers beneath the lead sheath 404 from contaminants such as moisture. According to one aspect of the present teachings, a layer 406 of steel tape and a layer 408 of reinforcing steel wires can be disposed underneath the lead sheath 404, and can provide reinforcing strength and shielding from electromagnetic fields. Two additional layers 410, 412 of steel tape can surround a conductive layer 414 of carbon and metallized paper. The conductive layer 414 can surround a layer 416 of semiconducting carbon paper, which in turn can surround five wedge-shaped conductors 418. Each of the five wedge-shaped conductors 418 can be surrounded by a layer 420 of semiconducting carbon paper. The illustrated semiconducting layers 420 separate the segmented conductors 418 from one another over the length of the cable 400. An aluminum support member 422 can be disposed at the center of the cable 400. According to other aspects of the present teachings, the aluminum support member 422 can be substituted with a filler, such as viscous oil or plastic, or remain hollow.

The five segmented conductors 418 illustrated FIG. 4 each include a wire bundle 424 having thirty conductive wires. According to one aspect of the present teachings, a subset of the conductive wires in the conductor 418 include a conducting metal having a particular characteristic skin depth surround the remaining wires of the conductor 418, which are made of a chemically distinct metal having a thicker characteristic skin depth value. For example, for a cylindrical wire conducting alternating current at 60 Hertz, the skin depth of copper and aluminum can vary by about 25 percent. Under such example conditions, an aluminum wire can exhibit a characteristic skin depth of 10.9 mm, while such a copper wire can exhibit a characteristic skin depth of 8.5 mm. According to one aspect of the present teachings, the total cross sectional area of the wires in the wire bundle 424 is at least about 2500 kcmil or greater. According to another aspect of the present teachings, the total cross sectional area of the wires in the wire bundle 424 is at least about 3000 kcmil or greater. According to yet another aspect of the present teachings, the total cross sectional area of the wires in the wire bundle 424 is at least about 3500 kcmil or greater.

Figure 5:
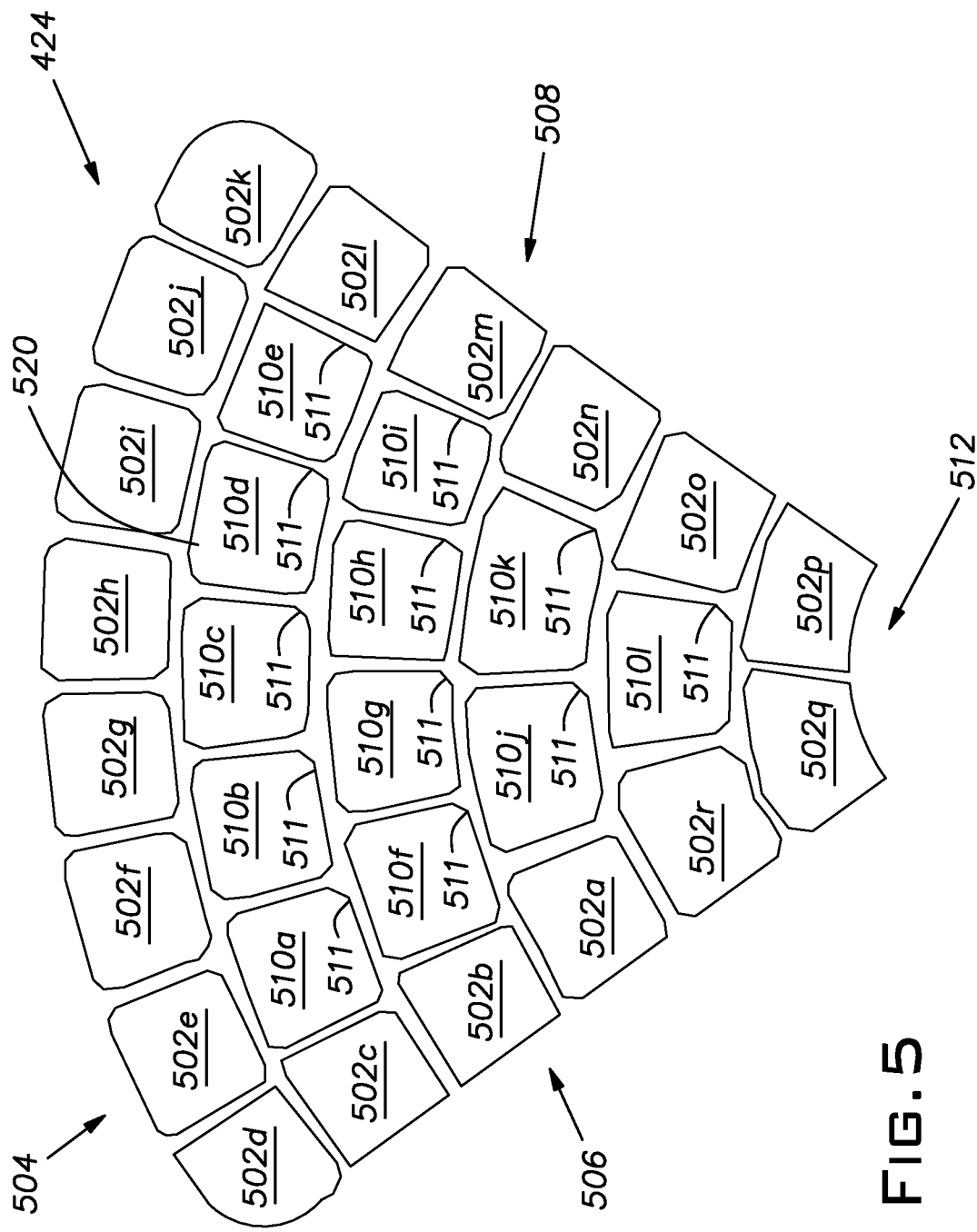
FIG. 5 illustrates a cross-sectional view of hybrid conductor 424.

With reference to FIG. 5, one of the wire bundles 424 of conductors 418 shown in FIG. 4 includes eighteen wires 502a-502r of a conductive metal arranged along the wide end 504, the first and second sides 506, 508 and narrow end 512 of the wedge-shaped conductor 418. The eighteen wires 502 can surround twelve wires 510a-510l of another conductive metal that form a conductor core 520. According to one aspect of the present teachings, each of the eighteen wires 502 includes copper, and each the twelve wires 510 at the core 520 includes aluminum. The wires 502, 510 can have trapezoidal, rectangular, circular, polygonal or other shapes.

With reference to FIGS. 4 and 5, five of the conductors 418 are arranged about the support member 422 such that the first side 506 of one of the wires bundles 424 is adjacent the second side 508 of an adjacent wire bundle 424, separated only by the semiconducting layers 420 surrounding the wire bundles 424. Each of the sides 506, 508 of the wire bundles 424 extends from the narrow end 512, which is adjacent to the support member 422, to the wide end 504, which is distal to the support member 422 relative to the bundle 424.

According to other aspects of the present teachings, more or less wire bundles and conductors can be implemented. For example, as few as four wire bundles and up to as many as six wedge-shaped bundles can be implemented according to the present teachings. In addition, a cable 400 can implement multiple wedge-shaped conductors each having a distinct arrangement of wires 502 of the first conductive material and wires 510 of the second conductive material. For example, bundles can have more than one layer of copper wires 502 surrounding a core 520 including aluminum wires. In yet another aspect, two or more bundles can have a common arrangement of wires 502 of the first conductive material and wires 510 of the second conductive material. According to one aspect of the present teachings, the ratio of the cross sectional area of aluminum wires to copper wires in the bundles 424 can differ from one another.

In the present disclosure, reference numerals followed by alphabetic indices refer to one of the illustrated elements, while use of the reference numeral without the alphabetic indices refer to one or more of the illustrated elements. For the purposes of this disclosure and unless otherwise specified, "a" or "an" means "one or more." To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. From about A to B is intended to mean from about A to about B, where A and B are the specified values.

The description of various embodiments and the details of those embodiments is illustrative and is not intended to restrict or in any way limit the scope of the claimed invention to those embodiments and details. Additional advantages and modifications will be apparent to those skilled in the art. Therefore, the invention, in its broader aspects, is not limited to the specific details and illustrative examples shown and described. Accordingly, departures may be made from such details without departing from the spirit or scope of the applicant's claimed invention.

The invention claimed is:

1. A cable comprising:
a plurality of elongated wedge cross-sectional shaped conductors operable to transmit electrical energy at medium or high AC voltages and each of the elongated conductors having a narrow end and an opposite wide end, a first side and an opposite second side extending from the narrow end to the wide end, the plurality of elongated conductors being disposed about a center of the cable so the first side and the second side of each of the plurality of elongated conductors are adjacent other ones of the plurality of elongated conductors, each of the elongated conductors having a core including a first plurality of wires of a first conductive material, and an outer layer surrounding the core including a second plurality of wires of a second conductive material, the first conductive material having a deeper characteristic skin depth than the second conductive material, the second plurality of wires of the second conductive material being positioned along the narrow and wide ends and along the first and second sides of the conductor to surround the first plurality of wires of the first conductive material; and,
wherein the total cross sectional area of the first and second plurality of wires in each of the plurality of conductors is at least about 2500 kcmil.

2. The cable of claim 1, wherein the elongated conductor has a wedge cross-sectional shape.

3. The cable of claim 1, wherein a nonconductive or semiconductive coating surrounds each of the plurality of elongated conductors and separates each of the plurality of elongated conductors from the adjacent elongated conductors.

4. The cable of claim 1, wherein the first conductive material includes aluminum.

5. The cable of claim 4, wherein the first plurality of wires have an outer barrier including aluminum oxide.

6. The cable of claim 5, wherein the second conductive material includes copper.

7. The cable of claim 1, wherein the second conductive material includes copper.

8. The cable of claim 7, wherein the second plurality of wires are uncoated.

9. The cable of claim 1, wherein the total cross sectional area of the first and second plurality of wires is at least about 3000 kcmil.

10. A cable comprising:
a plurality of segmented, wedge cross-sectional shaped conductors operable to transmit electrical energy at medium to high voltages and disposed centrally in the cable, the conductors wrapped in a non-conductive or semi-conductive sheath separating the conductors, the segmented conductors having:
a core including a first plurality of wires of a first conductive material;
an outer layer surrounding the core and having a second plurality of wires of a second conductive material, the first conductive material having a deeper characteristic skin depth than the second conductive material, the outer layer forming a narrow end and an opposite wide end, a first side and an opposite second side extending from the narrow end to the wide end, the narrow end being disposed toward a center of the cable so that the first side and the second side of each of the segments conductors is adjacent other ones of the segmented conductors, the second plurality of wires of the second conductive material being positioned along the narrow and wide ends and along the first and second sides of the conductor to surround the first plurality of wires of the first conductive material; and,
wherein the total cross sectional area of the first and second plurality of wires is at least about 2500 kcmil.

11. The cable of claim 10, wherein the first conductive material includes aluminum.

12. The cable of claim 11, wherein each of the first plurality of wires have an outer barrier including aluminum oxide.

13. The cable of claim 11, wherein the second conductive material includes copper.

14. The cable of claim 10, wherein the second conductive material includes copper.

15. A cable comprising:
an elongated wedge cross-sectional shaped conductor having a core including a first plurality of wires of a first conductive material, and an outer layer surrounding the core including a second plurality of wires of a second conductive material, the first conductive material having a deeper characteristic skin depth than the second conductive material, the outer layer forming a narrow end and an opposite wide end, a first side and an opposite second side each extending from the narrow end to the wide end, the narrow end being disposed toward a center of the cable, the second plurality of wires of the second conductive material being positioned along the narrow and wide ends and along the first and second sides of the conductor to surround the first plurality of wires of the first conductive material; and,
wherein the total cross sectional area of the first and second plurality of wires is at least about 2500 kcmil.

16. The cable of claim 15, wherein the first plurality of wires are uncoated.

17. The cable of claim 15, wherein the second plurality of wires are uncoated.

18. The cable of claim 15, wherein the total cross sectional area of the first and second plurality of wires is at least about 3000 kcmil.

19. The cable of claim 15, wherein the total cross sectional area of the first and second plurality of wires is at least about 3500 kcmil.

* * * * *